(12) United States Patent
Yamazaki

(10) Patent No.: US 6,919,841 B2
(45) Date of Patent: Jul. 19, 2005

(54) GPS RECEIVER SYSTEM

(75) Inventor: Toru Yamazaki, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/329,254

(22) Filed: Dec. 23, 2002

(65) Prior Publication Data
US 2003/0146868 A1 Aug. 7, 2003

(30) Foreign Application Priority Data

Dec. 27, 2001 (JP) ........................................ 2001-397547

(51) Int. Cl.[7] .............................. G01S 5/14; H04B 1/06; H04M 1/00
(52) U.S. Cl. .............................. 342/357.06; 342/357.1; 455/269; 455/575.9
(58) Field of Search .......................... 342/357.1, 357.02, 342/357.15, 357.06; 455/556.1, 575.7, 269, 575.9

(56) References Cited

U.S. PATENT DOCUMENTS

| 5,170,493 | A | * | 12/1992 | Roth ........................... 455/82 |
| 6,029,072 | A | * | 2/2000 | Barber ........................ 455/557 |
| 6,097,974 | A | * | 8/2000 | Camp et al. .............. 455/575.7 |
| 6,249,253 | B1 | * | 6/2001 | Nielsen et al. .............. 342/463 |
| 6,389,291 | B1 | * | 5/2002 | Pande et al. ............. 455/456.5 |
| 6,549,091 | B1 | * | 4/2003 | Spurell et al. .............. 333/124 |
| 2001/0028322 | A1 | | 10/2001 | Ueda et al. ............ 342/351.12 |
| 2003/0100333 | A1 | * | 5/2003 | Standke et al. ............. 455/552 |
| 2003/0132877 | A1 | * | 7/2003 | Forrester ................. 342/357.1 |

FOREIGN PATENT DOCUMENTS

| JP | 5-034431 | 2/1993 | |
| WO | WO 99/53595 A1 | * 10/1999 | ............. H02J/7/00 |

OTHER PUBLICATIONS

Examination Report dated Aug. 10, 2004 in corresponding Japanese Application No. 2001-397547.

* cited by examiner

Primary Examiner—Gregory C. Issing
(74) Attorney, Agent, or Firm—Harness, Dickey & Pierce, PLC

(57) ABSTRACT

In a GPS receiver system having a navigation GPS receiver unit and an assisted GPS receiver unit, a coupler is connected between a navigation GPS receiver and an assisted GPS receiver. A navigation GPS antenna is shared between the navigation GPS receiver and the assisted GPS receiver. With this configuration, an additional antenna for the assisted GPS receiver is not required. Therefore, the total number of parts included in the system is not increased.

9 Claims, 3 Drawing Sheets

FIG. 3A

|  | ANTENNA BPF | ANTENNA LNA GAIN | COUPLING LOSS | RECEIVER LNA GAIN | RECEIVER RF BPF | MIXER | RECEIVER IF BPF | TOTAL |
|---|---|---|---|---|---|---|---|---|
| GAIN | -0.9dB | 23.0dB | 0dB | 16.4dB | -1.2dB | 16.0dB | -4.0dB | 53.3dB |
| NF | 0.9dB | 1.4dB | 0dB | 1.4dB | 1.2dB | 11.0dB | 4.0dB | 2.3dB |

FIG. 3B

|  | ANTENNA BPF | ANTENNA LNA GAIN | COUPLING LOSS | RECEIVER LNA GAIN | RECEIVER RF BPF | MIXER | RECEIVER IF BPF | TOTAL |
|---|---|---|---|---|---|---|---|---|
| GAIN | -0.9dB | 23.0dB | -20.0dB | 16.4dB | -1.2dB | 16.0dB | -4.0dB | 33.3dB |
| NF | 0.9dB | 1.4dB | 20.0dB | 1.4dB | 1.2dB | 11.0dB | 4.0dB | 4.4dB |

GPS RECEIVER SYSTEM

CROSS REFERENCE TO RELATED APPLICATION

This application is based on and incorporates herein by reference Japanese Patent Application No. 2001-397547 filed on Dec. 27, 2001.

FIELD OF THE INVENTION

The present invention relates to a GPS receiver system that includes a standalone GPS receiver unit and an assisted GPS receiver unit.

BACKGROUND OF THE INVENTION

In GPS receiver systems, a standalone GPS receiver system, and an assisted GPS receiver system are available. In the standalone GPS receiver system, a position of an object is determined by the system alone. In the assisted GPS receiver system, a position of an object is determined by the system in cooperation with a location server. The standalone GPS receiver system is used in vehicle navigation systems installed in vehicles. The assisted GPS receiver system is used in mobile phone positioning systems, in which a position of an object is determined by a mobile phone in cooperation with a location server.

When the two systems are used together, a standalone GPS antenna and an assisted GPS antenna are required for the standalone GPS system and for the assisted GPS system, respectively. As a result, the number of parts in the system increases. This increases the cost and the complicity in the assembly process of the system. Moreover, a coaxial cable is required to connect the assisted GPS antenna and an assisted GPS receiver. This adds more assembly work and cost to the system.

In recent years, many vehicles have navigation systems, using a standalone GPS receiver system, as standard accessories. Therefore, chances of adding an assisted GPS receiver system to the navigation system increase when standalone and assisted GPS receiver systems are used together. In such a case, assembly work and cost in the manufacturing process of the system increase. When adding a standalone GPS receiver system to a GPS receiver system in which an assisted GPS receiver system is used, the same problem may occur.

SUMMARY OF THE INVENTION

The present invention therefore has an objective to provide a GPS receiver system that includes a standalone GPS receiver system and an assisted GPS receiver system at low cost. To provide the GPS receiver system at low cost, the number of parts in the present invention is maintained low, and therefore the assembly process of the system is simplified.

In a GPS receiver system of the present invention, either a standalone GPS antenna or an assisted GPS antenna is used for both standalone GPS receiver system and assisted GPS receiver system. Therefore, an additional antenna is not required when the assisted GPS receiver system is added to the GPS receiver system in which the standalone GPS receiver system is used. When adding the standalone GPS receiver unit to the GPS receiver system in which an assisted GPS receiver system, an additional antenna is not required either.

BRIEF DESCRIPTION OF THE DRAWINGS

The above and other objectives, features and advantages of the present invention will become more apparent from the following detailed description made with reference to the accompanying drawings. In the drawings:

FIG. 3 is a result table showing simulation results of NF;

DETAILED DESCRIPTION OF THE PREFERRED EMBODIMENT

The preferred embodiments of the present invention will be explained with reference to the accompanying drawings.

Figure 1:
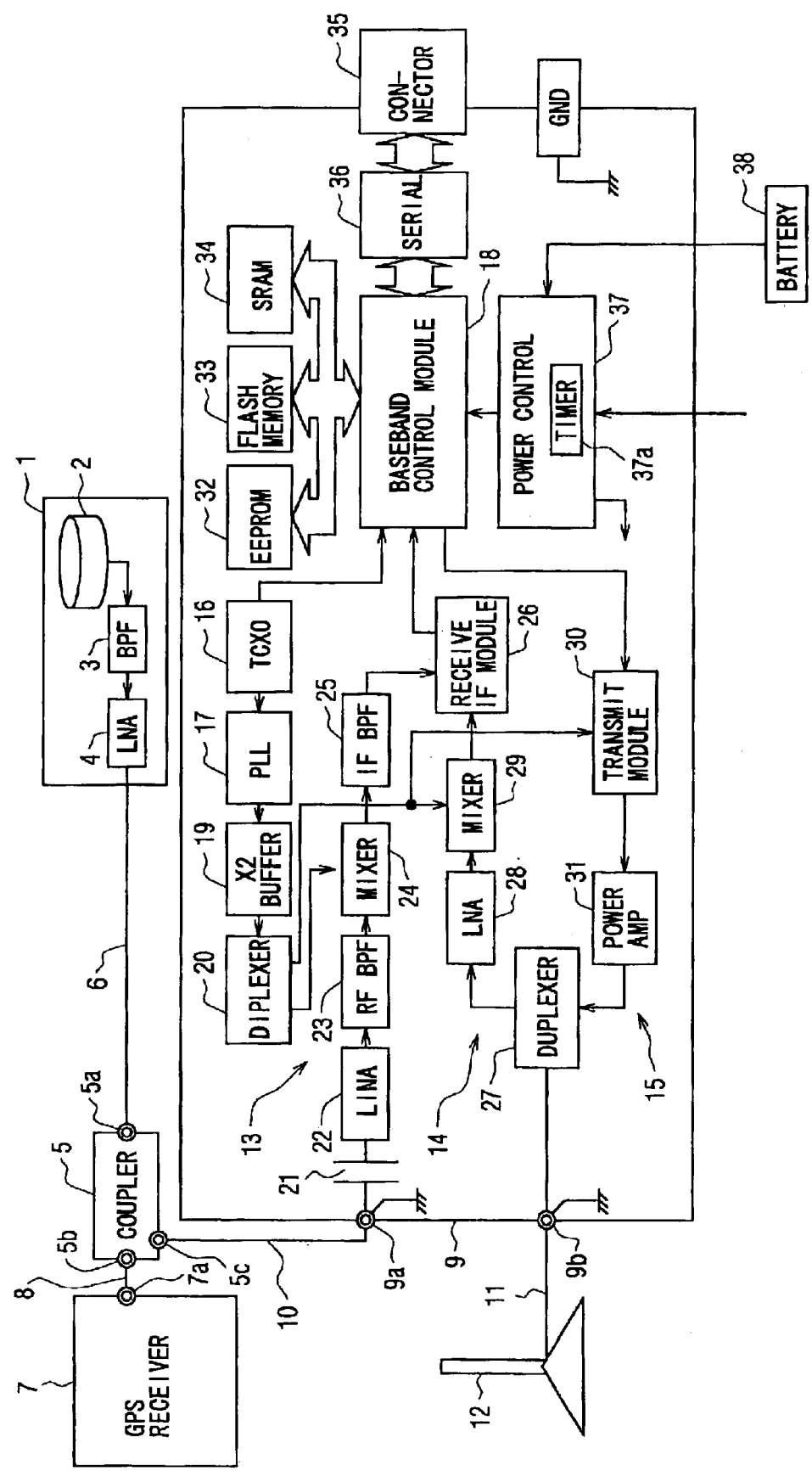
FIG. 1 is a schematic diagram showing a GPS system according to an embodiment of the present invention.

Referring to FIG. 1, a GPS antenna 1 for a vehicle navigation system includes an antenna body 2, a band-pass filter (BPF) 3, and a low noise pre-amplifier (LNA) 4. The GPS antenna 1 is connected to a coupler 5 via a coaxial cable 6. The antenna body 2 receives GPS signals from GPS satellites (not shown) and inputs the signals to the BPF 3. The BPF 3 filters out unwanted frequency components of the inputted GPS signals, and outputs the filtered signals to the LNA 4. The LNA 4 amplifies the filtered signals, and outputs the amplified signals to the coupler 5.

The coupler 5 is connected to a coupler-side terminal 7a of a vehicle navigation GPS receiver 7 via a coaxial cable 8. The navigation GPS receiver 7 corresponds to the standalone GPS receiver unit of the present invention. The coupler 5 is also connected to a coupler-side terminal 9a of an assisted GPS receiver 9 via a coaxial cable 10. The assisted GPS receiver 9 corresponds to the assisted GPS receiver unit of the present invention.

The navigation GPS receiver 7 includes a CPU that is programmed to perform vehicle navigation operations. The operations include specifying a current position by demodulating a signal inputted from the GPS antenna 1 via the coupler 5, accepting destination information from a user, displaying a calculated route from the current position to the destination.

The assisted GPS receiver 9 is connected to a code division multiple access (CDMA) antenna 12 via a coaxial cable 11, which is connected to a CDMA antenna-side terminal 9b. The terminals 9a, 9b are grounded. The assisted GPS receiver 9 includes a GPS receiver circuit 13, a CDMA receiver circuit 14, and a CDMA transmitter circuit 15. The GPS receiver circuit 13, the CDMA receiver circuit 14, and the CDMA transmitter circuit 15 perform GPS signal receiving operations, CDMA signal receiving operations, and CDMA signal transmission operations, respectively.

A temperature compensated crystal oscillator (TCXO) 16 outputs oscillation frequency signals to a phase locked loop (PLL) 17 and a baseband control module 18. The PLL 17 is constructed of a regular phase comparator, a loop filter, and voltage controlled oscillator (VCO). The PLL 17 generates VCO output signals by PLL control, and outputs the signals to a doubler buffer 19.

The doubler buffer 19 generates reference frequency signals by doubling the VCO signals from the PLL 17, and outputs the signals to a diplexer 20. The diplexer 20 outputs the reference frequency signals to the GPS receiver circuit 13, the CDMA receiver circuit 14, and the CDMA transmitter circuit 15.

The GPS receiver circuit 13 includes a capacitor 21, an LNA 22, a radio frequency (RF) BPF 23, a mixer 24, an intermediate frequency (IF) BPF 25, and a receive IF module 26. The LNA 22 receives GPS signals as receive frequency signals from the GPS antenna via the coupler 5, amplifies the signals, and outputs the amplified signals to the RF BPF 23. The RF BPF 23 filters out the unwanted frequency components of the amplified signals, and outputs the filtered signals to the mixer 24.

The mixer 24 mixes the receive frequency signals with the reference frequency signals, and produces IF signals. Then, the mixer 24 outputs the IF signals to the IF BPF 25. The IF BPF 25 filters out unwanted frequency components of the IF signals, and outputs the filtered signals to the receive IF module 26. The receive IF module 26 processes the filtered signals and outputs the processed signals to the baseband control module 18. The baseband control module 18 performs baseband processing on the IF signals that are processed for reception.

The CDMA receiver circuit 14 includes an antenna duplexer 27, an LNA 28, a mixer 29, and the receive IF module 26. The CDMA antenna 12 receives CDMA signals from a CDMA base station (not shown). The antenna duplexer 27 outputs the CDMA signals, which are inputted through the CDMA antenna 12, to the LNA 28. The LNA 28 amplifies the CDMA signals, which are inputted from the antenna duplexer 28, and outputs the amplified signals to the mixer 29.

The mixer 29 mixes the amplified signals with reference signals inputted from the diplexer 20, and outputs the mixed signals to the receive IF module 26. The receive IF module 26 processes the mixed signals and outputs the processed signals to the baseband control module 18. The baseband control module 18 performs baseband processing to the processed signals.

The CDMA transmitter circuit 15 includes a transmit module 30, a power amplifier 31, and the antenna duplexer 27. The transmit module 30 processes CDMA signals inputted from the baseband control module 18, and mixes the processed signals with reference frequency signals inputted from the diplexer 20. Then, the transmit module 30 outputs the mixed signals to the power amplifier 31.

The power amplifier 31 amplifies the mixed signals and outputs the amplified signals to the antenna duplexer 27. The antenna duplexer 27 transmits the CDMA signals inputted from the power amplifier 31 to the CDMA base station. The baseband control module 18 exchanges data between an EEPROM 32 and a flash memory 33 or SRAM 34. When an external device is connected to a connector 35, the baseband control module 18 exchanges data with the external device via a serial IF 36.

A power controller 37 is directly connected to a battery 38, and supplied with DC power by the battery 38 regardless of the condition of the ignition key switch. The power controller 37 performs controls to supply DC power to circuits or devices, including the baseband control module 18, when the ignition key switch is ON. Even when the switch is OFF, the power controller 37 performs the control if it receives a security signal or a timer 37a expires.

The assisted GPS receiver 9 starts operating when the DC power is supplied to the baseband control module 18 or other components. The timer 37a starts counting time when the assisted GPS receiver 9 starts operating. When the timer counts to a predetermined time, the power supply is stopped. The start and stop of the power supply are repeated at regular interval.

Figure 2:
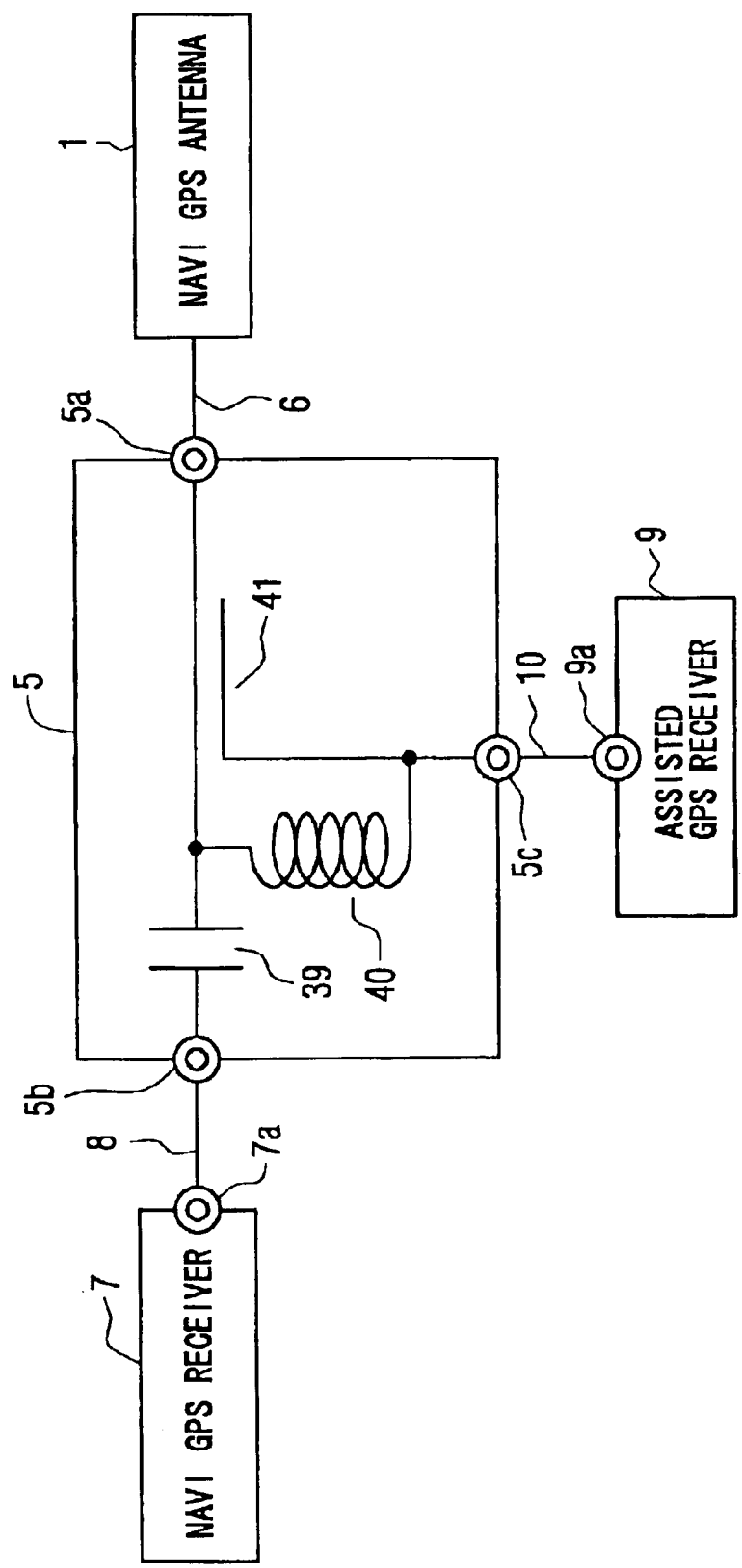
FIG. 2 is a circuit diagram showing a coupler and its connections to GPS receivers and a GPS antenna.

Referring to FIG. 2, the coupler 5 includes a capacitor 39 connected between terminals 5a, 5b to reduce a DC current flowing from the GPS receiver 7 to the GPS antenna 1. The GPS receiver 7 is connected to the battery 38 via the ignition key switch. Therefore, DC power is supplied to the GPS receiver 7 only when the ignition key switch is ON. A coil 40 is connected between the terminal 5a, 5c. DC power is supplied from the battery 38 to the GPS antenna 1 via the coil 40. DC power is supplied from the battery to the GPS antenna 1 via the coil 40.

A directional coupler 41 is provided in the form of a conductor pattern on a circuit wiring board in parallel with a signal line between the GPS antenna 1 and the GPS receiver 7. It has loose coupling characteristic with a predetermined degree of coupling. With this configuration, the GPS signals transmitted to the GPS receiver 7 via the GPS antenna 1 becomes relatively large. On the other hand, the GPS signals transmitted to the GPS receiver 9 via the GPS antenna 1 becomes relatively small. The GPS antenna 1 can be shared between the navigation GPS receiver 7 and the assisted GPS receiver 9 via the coupler 5.

A comparison was performed between this embodiment and an example of the related art to find out effect on the GPS signal receiving sensitivities when the coupler 5 is used. The example of the related art does not include the coupler 5, and the assisted GPS receiver 9 is directly connected to the assisted GPS antenna. In this comparison, noise figures (NF) in RF section of the assisted GPS receiver 9 were measured. The results are shown in FIG. 3.

Referring to FIG. 3A, the NF in the entire RF section of the assisted GPS receiver 9 of the related art is 2.3 dB. Assuming that a coupling loss of the coupler 5 is −20.0 dB, the NF in the entire RF section of the assisted GPS receiver 9 of this embodiment is 4.4 dB as shown in FIG. 3B. That is, the NF changes from 2.3 dB to 4.4 dB when the coupler 5 is used. It can be concluded that the receiving sensitivity is reduced only by about 2 dB even when the coupler 5 is used. Therefore, the sensitivity of the navigation GPS receiver 7 is reduced only by 1% compared to the example of the related art.

Assuming that the highest receiving sensitivity of the assisted GPS receiver 9 of the related art is −153 dBm, the highest receiving sensitivity of this embodiment is calculated as follows:

−153 (dBm)−(4.4 (dB)−2.3 (dB))=−151 (dBm)

In general, the highest receiving sensitivity of the navigation GPS receiver 7 is −133 dBm. Assuming that the assisted GPS receiver 9 has similar sensitivity to the navigation GPS receiver 7, the measured highest sensitivity is 18 dB higher than the general highest sensitivity. Therefore, the assisted GPS receiver 9 can work properly in this configuration.

In this embodiment, only one antenna is required because the coupler 5 is connected between the navigation GPS receiver 7 and the assisted GPS receiver 9 to share the GPS antenna 1. Therefore, the total number of parts of the system is less than the system having an additional antenna for the assisted GPS receiver 7. This also can reduce the manufacturing cost and simplifies the assembling process.

The navigation GPS antenna 1 is supplied with power by the assisted GPS receiver 9. Therefore, the navigation GPS receiver 7 is not necessary to power up for supplying power to the GPS antenna 1. This reduces power consumption of the system as a whole.

The assisted GPS receiver 9 starts operating, even under the condition that the ignition key switch is OFF, to receive a security signal outputted when the vehicle has an impact from the outside. Moreover, it starts up when the timer 37a expires even when the ignition key switch is OFF. That is, the assisted GPS receiver 9 can be started to determine a position of a vehicle in the event that a vehicle is stolen, and the determined position is used to track the stolen vehicle.

The present invention should not be limited to the embodiment previously discussed and shown in the figures, but may be implemented in various ways without departing from the spirit of the invention.

For example, applications of the standalone GPS receiver system are not limited to vehicle navigation systems. An assisted GPS antenna can be shared by the navigation GPS receiver and the assisted GPS receiver, instead of the navigation GPS antenna. The navigation GPS antenna is not limited to the configuration in which the BPF and the LNA are included. The BPF and the LNA can be removed as long as the performance is maintained.

The coupler 5 can be constructed of a capacitor with loose coupling instead of the conductive pattern. In the power controller, the trigger to start supplying DC power to the baseband control module or other components is not limited to the external security signal or expiration of the timer. In the assisted GPS receiver, a battery may be installed and power is supplied from the battery to the GPS receiver. The assisted GPS receiver may use other communication system including the time division multiple access (TDMA) system instead of the CDMA system.

What is claimed is:

1. A GPS receiver system comprising:

a standalone GPS receiver system that includes a standalone GPS receiver unit for a vehicle navigation system and independently performs a positioning operation; and an assisted GPS receiver system that includes an assisted GPS receiver unit for mobile communications and performs a positioning operation in cooperation with a location server, wherein the standalone GPS receiver unit starts and stops receiving power according to on and off operations of an ignition key switch of a vehicle, the assisted GPS receiver unit contains a transmitter section and a receiver section for the mobile communication, the standalone GPS receiver unit and the assisted GPS receiver unit share any one of a standalone GPS antenna for the standalone GPS receiver system and an assisted GPS antenna for the assisted GPS receiver system; and the transmitter section and the receiver section of the assisted GPS receiver unit receive power regardless of the on and off operation of the ignition key switch for transmitting position information acquired by the assisted GPS receiver unit to an external device and for supplying power to the GPS antenna.

2. The GPS receiver system according to claim 1, further comprising a coupler connected among the standalone GPS antenna, the standalone GPS receiver unit, and the assisted GPS receiver unit so that the standalone GPS antenna can be shared by the standalone GPS receiver unit and the assisted GPS receiver unit.

3. The GPS receiver system according to claim 2, wherein the standalone GPS antenna receives power from the assisted GPS receiver unit.

4. The GPS receiver system according to claim 2, further comprising a power controller for controlling power supply to the assisted GPS receiver unit.

5. The GPS receiver system according to claim 4, further comprising a timer in the power controller.

6. The GPS receiver system according to claim 2, wherein
the standalone GPS receiver system and the assisted GPS receiver system are configured so that they can be installable to the vehicle; and
the assisted GPS receiver system starts operating, even under a condition that the ignition key switch is off, to receive a security signal outputted when the vehicle has an impact from outside of the vehicle.

7. The GPS receiver system according to claim 2, wherein:
the standalone GPS receiver system and the assisted GPS receiver system are configured so that they are installable to the vehicle; and
the assisted GPS receiver system starts operating under the condition that a timer expires even when the ignition key switch is off.

8. The GPS receiver system according to claim 4, wherein:
the standalone GPS receiver unit and the assisted GPS receiver unit are installed in the vehicle; and
the power controller performs control for halting power supply from a battery to the standalone GPS receiver unit and for starting power supply from the battery to the assisted GPS receiver unit when the ignition key switch is off.

9. The GPS receiver system according to claim 6, wherein:
the assisted GPS receiver unit has a wireless communication function; and
the assisted GPS receiver unit transmits position information, which is acquired by the assisted GPS receiver unit, to the external device via the wireless communication function.

* * * * *